United States Patent
Trim et al.

(10) Patent No.: US 10,901,689 B1
(45) Date of Patent: Jan. 26, 2021

(54) DYNAMIC AUGMENTED REALITY INTERFACE CREATION

(71) Applicant: International Business Machines Corporation, Armonk, NY (US)

(72) Inventors: Craig M. Trim, Ventura, CA (US); Shikhar Kwatra, Durham, NC (US); Zachary A. Silverstein, Austin, TX (US); Robert Huntington Grant, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/508,435

(22) Filed: Jul. 11, 2019

(51) Int. Cl.
| | |
|---|---|
| *G06F 3/16* | (2006.01) |
| *G06F 9/451* | (2018.01) |
| *G10L 15/02* | (2006.01) |
| *G06F 3/0482* | (2013.01) |
| *G06F 16/638* | (2019.01) |

(52) U.S. Cl.
CPC ............ *G06F 3/167* (2013.01); *G06F 3/0482* (2013.01); *G06F 9/451* (2018.02); *G06F 16/638* (2019.01); *G10L 15/02* (2013.01)

(58) Field of Classification Search
CPC ................................. G06F 3/167; G06F 9/451
USPC ........................................................ 715/728
See application file for complete search history.

(56) References Cited

U.S. PATENT DOCUMENTS

| | | |
|---|---|---|
| 5,564,004 A | 10/1996 | Grossman et al. |
| 5,754,179 A | 5/1998 | Hocker et al. |
| 6,426,761 B1 | 7/2002 | Kanevsky et al. |
| 2014/0310595 A1 | 10/2014 | Acharya et al. |
| 2016/0165170 A1* | 6/2016 | McRae ................. G08C 23/04 348/734 |
| 2016/0203002 A1* | 7/2016 | Kannan ................ G06F 9/4843 715/708 |
| 2016/0274762 A1 | 9/2016 | Lopez et al. |

(Continued)

FOREIGN PATENT DOCUMENTS

| | | |
|---|---|---|
| CN | 107506037 A | 12/2017 |
| WO | 2015192117 A1 | 12/2015 |

OTHER PUBLICATIONS

Khan et al., "Internet of Things Interface Using Augmented Reality", Research Gate, Feb. 2018, DOI: 10.13140/RG.2.2.20086.29766, 6 pages. https://www.researchgate.net publication/323085129_Internet_Of_Thingsinterface_Using_Augmented_Reality_Concept_Of_Digital_Wires.

(Continued)

*Primary Examiner* — William D Titcomb
(74) *Attorney, Agent, or Firm* — Timothy I. Singleton (57) ABSTRACT

A method for dynamic augmented reality interface creation is provided. The method detects an utterance from a user of an augmented reality device and determines an ambiguity level of the utterance. The method generates a set of visual artifacts based on the utterance and the ambiguity level. The visual artifacts are generated within an augmented reality use interface, with each visual artifact corresponding to a selectable function. The method detects an interaction with a first visual artifact corresponding to a first selectable function. The method modifies the augmented reality user interface in response to the interaction with the first visual artifact.

20 Claims, 6 Drawing Sheets

(56) References Cited

U.S. PATENT DOCUMENTS

2017/0324726 A1* 11/2017 Alleaume ............... G06F 3/167
2018/0196522 A1     7/2018 Rochford et al.
2019/0001219 A1*  1/2019 Sardari ................ G06N 5/025
2019/0235887 A1*  8/2019 Hemaraj ............... G10L 15/22

OTHER PUBLICATIONS

Zachariah et al., "Browsing the Web of Things in Mobile Augmented Reality", The 20th International Workshop on Mobile Computing Systems and Applications (HotMobile '19), Feb. 27-28, 2019, Santa Cruz, CA, ACM, New York, 6 pages.

"Augmented Reality Interface for Visualizing and Interacting with IoT Devices", IP.com Disclosure No. IPCOM000255233D, Publication Date: Sep. 11, 2018, 22 pages.

\* cited by examiner

DYNAMIC AUGMENTED REALITY INTERFACE CREATION

BACKGROUND

The present disclosure relates generally to methods for user interface generation, but not exclusively, to a computer-implemented method for dynamically generating contextualized augmented reality user interfaces. The present disclosure relates further to a related system for augmented reality user interfaces, and a computer program product for operating such a system.

Virtual assistants are used by some companies, software producers, and device manufacturers to facilitate access or operation of a device or program by a user. Virtual assistants often listen for and respond to predetermined keywords linked to operations programmed for the virtual assistant. These predetermined keywords and functions may be established by a company associated with the virtual assistant.

Augmented reality systems are used by companies in photography, videography, and messaging applications. Often such augmented reality systems provide visual effects overlaid onto a video stream, in order to capture images or video containing the visual effects. Augmented reality systems may also provide predefined functionality, such as a heads up display for depicting driving directions.

SUMMARY

According to an embodiment described herein, a computer-implemented method for dynamic augmented reality interface creation is provided. The method detects an utterance from a user of an augmented reality device and determines an ambiguity level of the utterance. The method generates a set of visual artifacts based on the utterance and the ambiguity level. The visual artifacts are generated within an augmented reality use interface, with each visual artifact corresponding to a selectable function. The method detects an interaction with a first visual artifact corresponding to a first selectable function. The method modifies the augmented reality user interface in response to the interaction with the first visual artifact.

DETAILED DESCRIPTION

The present disclosure relates generally to methods for user interface generation, but not exclusively, to a computer-implemented method for dynamically generating contextualized augmented reality user interfaces. The present disclosure relates further to a related system for augmented reality user interfaces, and a computer program product for operating such a system.

Virtual assistants are becoming prevalent in the home and outside. These virtual assistants may provide vocal interaction with speaker and microphone devices such as smart phones, smart speakers, smart homes, tablet devices, cars, and other mobile and stationary computing devices. Virtual assistants may also provide connection to and interaction with Internet of Things (IoT) devices and data sources. However, virtual assistants may be limited to small devices with no or limited visual interfaces. Users may encounter difficulties interacting with such virtual assistants and knowing varying navigation options or sources for the virtual assistants. Similarly, users may desire additional ways of interfacing with virtual assistants. In embodiments of the present disclosure, augmented reality devices may provide an additional interface option and provide technical solutions to interface issues between users and virtual assistants.

Augmented reality devices may enable an overlay of a user interface onto the real world, as seen by the user. However, augmented reality interfaces may be confused or uncoordinated, divorced from actions and movements of the user. Embodiments of the present disclosure enable dynamic generation of a contextualized augmented reality interface. Such contextualized augmented reality interfaces may enable a user to better interact with virtual assistants and an environment of the user. Further, inputs from the augmented reality devices may provide additional contextualizing input to enable virtual assistants to provide additional information regarding functions and selection options with a more economical user interface and without a display device dedicated to the virtual assistant.

Embodiments of the present disclosure may provide methods and systems for creation of a dynamic user interface being overlaid in an augmented reality or virtual reality device. These user interfaces may correlate user interface creation features by learning from user vocalizations and utterances. Further embodiments of the present disclosure utilize user and virtual assistant interactions and responses (e.g., successful responses and failed responses) to assist in contextualizing dynamically generated augmented reality and virtual reality user interfaces. Some embodiments of the present disclosure consider inputs from a global corpus (e.g., a global profile of users of the presently disclosed methods and systems) to assist in contextualization of user interfaces and user responses and interactions. Embodiments of the present disclosure may also receive and interpret interactions with IoT devices and IoT connected virtual assistants and display sources to present the dynamically created intuitive user interface to the user in an augmented reality or virtual reality environment. Further, embodiments of the present disclosure enable a user to interface with or connect to an API of an available service.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
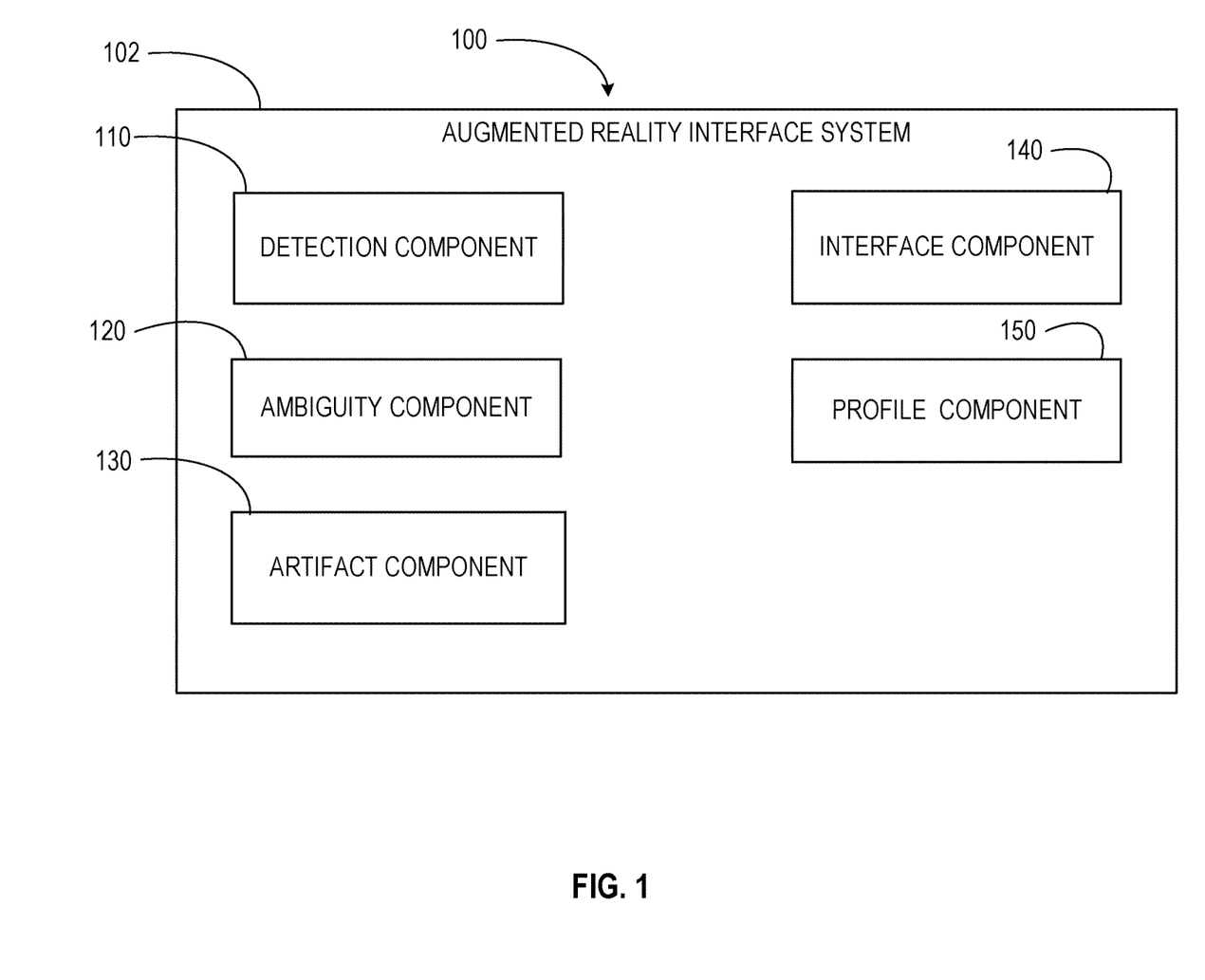
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise an augmented reality interface system 102. The augmented reality interface system 102 may comprise a detection component 110, an ambiguity component 120, an artifact component 130, an interface component 140, and a profile component 150. The detection component 110 detects vocalizations and utterances at an augmented reality device. The ambiguity component 120 determines and quantifies relative levels of ambiguity of detected utterances. The artifact component 130 generates visual artifacts within an augmented reality user interface based on utterances and ambiguity levels of those utterances. The interface component 140 detects interactions with visual artifacts within the augmented reality user interface. The profile component 150 models user profiles and modifies profiles and models based on interactions detected by the interface component 140 corresponding to utterances detected by the detection component 110. Although described with distinct components, it should be understood that, in at least some embodiments, components may be combined or divided, or additional components may be added, without departing from the scope of the present disclosure.

Figure 2:
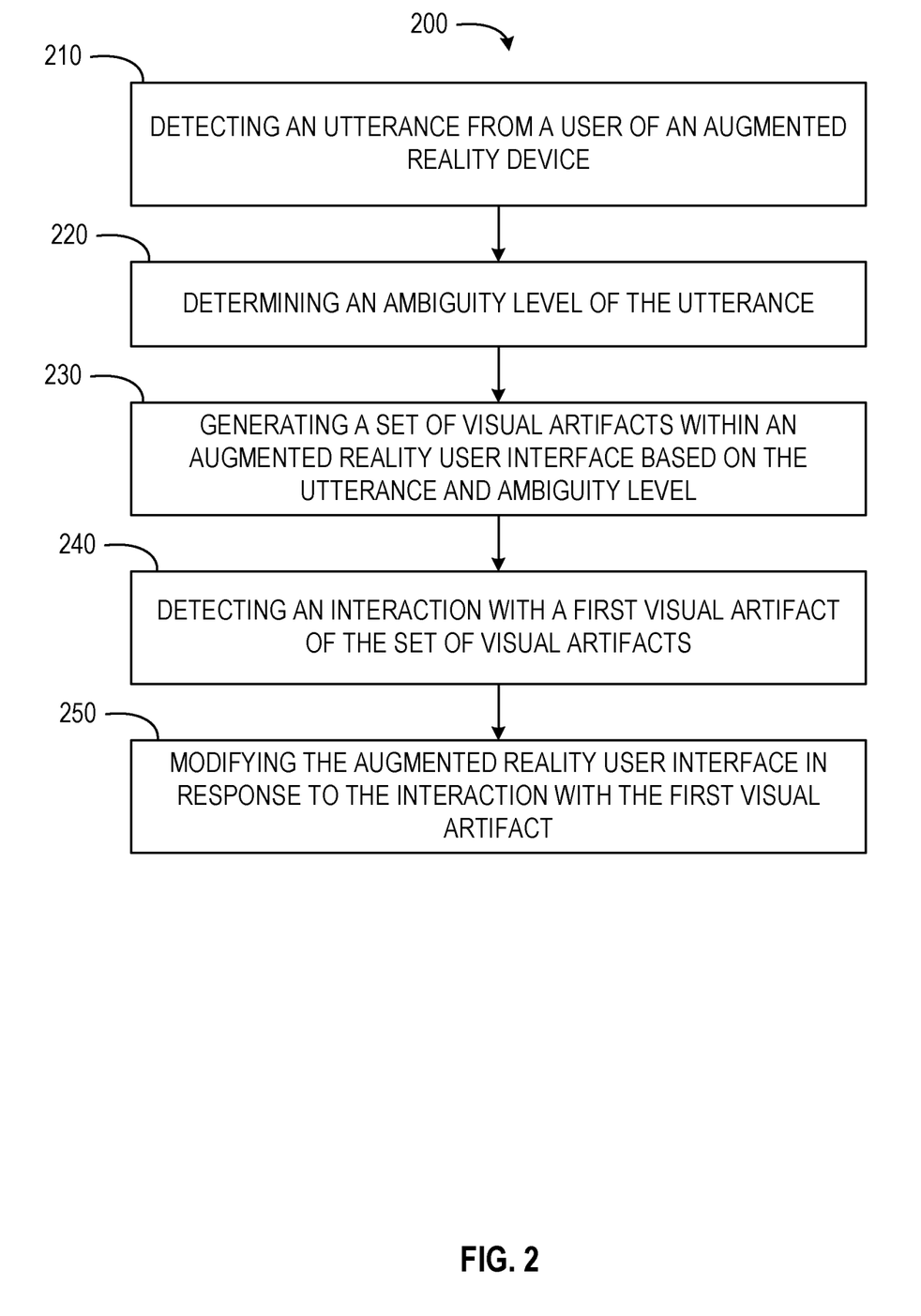
FIG. 2 depicts a flow diagram of a computer-implemented method for dynamic augmented reality interface creation, according to at least one embodiment.

Referring now to FIG. 2, a flow diagram of a computer-implemented method 200 is shown. The computer-implemented method 200 is a method for dynamic augmented reality interface creation. In some embodiments, the computer-implemented method 200 may be performed by one or more components of the computing environment 100, as described in more detail below.

At operation 210, the detection component 110 detects an utterance from a user of an augmented reality device. In some embodiments, the utterance may be captured through one or more of the augmented reality device (e.g., a smart glasses, a headset, a visor, a smartphone operating in an augmented reality mode), a virtual assistant, a mobile computing device (e.g., a smartphone or smart speaker), combinations thereof, or any other suitable device. The detection component 110 may detect the utterance using a microphone or other audio input of a suitable computing device. In some embodiments, the detection component 110 comprises, includes, or is part of a speech recognition application. The detection component 110 may also detect the utterance by receiving the utterance from another computing device or a virtual assistant. For example, the utterance may be detected by a smart speaker on which a virtual assistant is running. The smart speaker may transmit or pass the utterance, or portions thereof, to the detection component 110 via one or more communication protocols or connections. In this way, the detection component 110 may receive or detect utterances even when not directly connected to an audio input device such as a microphone.

In some embodiments, the detection component 110 initially detects the utterance as a vocalization. The vocalization may be detected at the augmented reality device, a mobile computing device, a virtual assistant device, or combinations thereof. The detection component 110 may detect mel-frequency cepstrum (MFC) representations of sounds within an audio stream. The detection component 110 may identify mel-frequency cepstral coefficients (MFCCs) that form the MFC. The MFCCs may be used as features, by the detection component 110, to recognize the vocalization as speech. The detection component 110 may extract the speech features from the audio stream and apply natural language processing (NLP) operations to recognize keywords within the audio steam. In some embodiments, the detection component 110 may recognize keywords by semantic content analysis using one or more NLP operations, functions, or applications. In some embodiments, the detection component 110 uses NLP analysis to determine the vocalization is an utterance containing keywords.

The detection component 110 compares the vocalization to one or more vocalization profiles. The vocalization profiles may be a data structure of historical utterances and functions or operations selected contemporaneous to the utterance. In some embodiments, vocalization profiles are models for historical usage of one or more users generated using utterances, keywords identified within utterances, functions associated with the utterances, frequency of usage for utterances, combinations thereof, and any other characteristics or aspects defining user interactions with the augmented reality interface system 102. In some instances, the detection component 110 compares the vocalization to one or more vocalization profiles by matching keywords of the utterance to keywords within the one or more vocalization profiles. Based on comparison of the vocalization to the vocalization profiles, the detection component 110 determines the vocalization is an utterance corresponding to one or more functions by looking up one or more functions, within the one or more vocalization profiles, associated with each keyword of the utterance.

In some embodiments, the one or more vocalization profiles includes a global profile. The global profile may represent utterances of a plurality of users. In some embodiments, the global profile defines utterance characteristics of the plurality of users. The detection component 110 may generate or build the global profile by capturing vocalizations and utterances of all users (e.g., crowdsourcing vocal interactions) of the augmented reality interface system 102. The detection component 110 may detect what users say, using MFCC based speech feature extraction and NLP enabled keyword and semantic content analysis. The detection component 110 may correlate the vocalizations and utterances of the users with applications, functions, operations, and IoT devices with which the vocalizations or utterances interact. The detection component 110 may then associate or otherwise link at least one function, operation, or device with each vocalization or utterance, or keywords found within the vocalization or utterance. In some instances, an image capture device or a camera may detect and capture user activity, using regional convolutional neural networks (R-CNN) for object detection within a geospatial environment. For example, where the utterance includes keywords associated with a camera enabled IoT device, the detection component 110 may employ R-CNN to detect a visual context of the utterance and operation of the IoT device associated with the utterance. The detection component 110 may determine a frequency of use of the vocalizations or utterances and correlated applications, functions, operations, or devices. The detection component 110 may use a recurrent neural network (RNN) or long short term memory network (LSTM) models to correlate functions or operations and vocalizations or utterances identified using NLP. The detection component 110 may generate the global profile as a function of utterances, operations, frequencies, and contexts for interactions across all users of the augmented reality interface system 102. In some instances, the global profile is stored in a cloud database with an anonymized record of credentials and sanitized transcripts for model training, testing, and updating.

In some embodiments, the one or more vocalization profiles includes a user profile. The user profile may represent historical utterances of the user of the augmented reality device. In some embodiments, the user profile defines utterance characteristics of the user of the augmented reality device. The user profile may be generated in a manner similar to that described above for the global profile. The user profile may be specific to the user of the augmented reality device such that vocalizations or utterances, correlated operations, frequencies, and devices may be tailored to or modeled on historical interactions of the user. In some embodiments, the user profile may be used to identify or model frequency of use of utterances and operations, context of operation or utterance usage, and other characteristics of the user's interactions with the augmented reality interface system 102.

In some embodiments, the detection component 110 compares the utterance or vocalization detected in operation 210 with MFCC speech features or NLP features identified or generated for the user and stored within the user profile. The detection component 110 may compare one or more of speech patterns, vocal register, word choice or vernacular, combinations thereof, or any other suitable voice or speech characteristics to speech characteristics stored within the user profile. Where the detection component 110 matches a sufficient portion of the speech characteristics in the vocalization or utterance with speech characteristics within the user profile, the detection component 110 may determine that the utterance is from the user. In such embodiments, the detection component 110 may select the vocalization profile of the user (e.g., the user profile) for use in the method 200. Where the detection component 110 fails to match a sufficient number of speech characteristics of the vocalization or utterance with those of the user profile, the detection component 110 may determine the vocalization or utterance is from an alternate user and select the global profile for use in the method 200. Further, in some embodiments, the detection component 110 may ignore a vocalization or utterance which fails to match speech characteristics of the user and the user profile.

In some embodiments, the detection component 110 provides a mechanism to allow a user to opt-in or opt-out of services provided by the augmented reality interface system 102. The opt-in/opt-out mechanism configures the detection component 110 according to user preferences such that any data collection (e.g., detecting vocal utterances) is done with the user's consent. Further, once the user performs opt-in or opt-out selections, the detection component 110 or the interface component 140 may pass the selections to the profile component 150. The profile component 150 may store the selected preferences within a user profile for the user. In some embodiments, the profile component 150 generates and transmits or displays a notification to the user indicating the change in the user profile regarding the opt-in/opt-out selection. Further, in some embodiments, based on user preferences for opt-in/opt-out and data collection, the artifact component 130 and the interface component 140 may generate and transmit or display a notification to the user when data collection occurs by any of the components of the augmented reality interface system 102, such as the detection component 110.

At operation 220, the ambiguity component 120 determines an ambiguity level of the utterance. The ambiguity level may be a quantification of an ambiguous nature of the utterance. The ambiguity component 120 may determine ambiguity for the utterance indicating an ambiguity associated with a source of data for actions or operations associated with the utterance. The ambiguity component 120 may determine ambiguity with an action or operation to be performed based on the utterance (e.g., which operation or function correlates to the utterance). The ambiguity component 120 may determine ambiguity regarding a context of the utterance.

In some embodiments, the ambiguity component 120 determines the ambiguity level by receiving keywords, determined for the utterance using NLP processing, from the detection component 110. The ambiguity component 120 may identify a plurality of operations and contexts associated with at least one keyword received from the detection component 110. The ambiguity component 120 may identify the plurality of operations and contexts associated with the keyword by accessing at least one vocalization profile (e.g., the global profile, the user profile, or both) and parsing the vocalization profile for keywords, associated functions, and associated contexts. The ambiguity component 120 may determine a probability that the utterance refers to each associated function based on the keywords of the utterance, the context of the utterance, and a frequency of use of the utterance and function. For example, a keyword of the utterance may be associated with three operations. The ambiguity component 120 may determine a first probability of seventy-five percent that the keyword is intended to refer to a first operation, a second probability of sixty-three percent that the keyword refers to a second operation, and a forty-nine percent probability that the keyword refers to a third operation. Based on the probabilities and the profiles, the ambiguity component 120 determines the ambiguity level as relatively high. For example, the ambiguity component 120 may determine the ambiguity level as a function of the three differing operations weighted against the probability determined for each operation.

At operation 230, the artifact component 130 generates a set of visual artifacts within an augmented reality user interface. The artifact component 130 may generate the set of visual artifacts based on the utterance and the ambiguity level. In some embodiments, each visual artifact of the set of visual artifacts corresponds to a selectable function. The set of visual artifacts may be generated as a dynamic user interface presented in an augmented reality context.

In some embodiments, the artifact component 130 generates each visual artifact of the set of visual artifacts as a visual representation of a function. Each visual artifact may be generated as a pop-up window, a dialogue box, a speech bubble, a shape with or without words, combinations thereof, or any other suitable and relevant visual representation of the function associated with the visual artifact. For example, where the utterance includes keywords of "open" and "music," the utterance may be associated with initiating or opening two differing music applications stored on a mobile computing device. The artifact component 130 may generate two visual artifacts, each being associated with opening or initiating a different music application. The artifact component 130 may then present the two visual artifacts in an augmented reality user interface. For example, the artifact component 130 may generate a first visual artifact as a first icon of a first music application and generate a second visual artifact as a second icon of a second music application. The artifact component 130 may then display the first visual artifact and the second visual artifact as two boxes or icons floating above a smart speaker executing a virtual assistant. Where the user looks away from the smart speaker, the first and second visual artifacts may disappear or be removed from a field of view. Where the user returns the smart speaker to the field of view depicted by a pair of smart glasses displaying an ad hoc augmented reality user interface, the artifact component 130 may again display the first and second visual artifacts. Thus, the artifact component 130 may generate an ad hoc augmented reality or virtual reality user interface for a user based on the user's utterance, context, user profile or global profile, applications frequented by the user, devices frequented by the user, the user's previous commands, and one or more events.

At operation 240, the interface component 140 detects an interaction with a first visual artifact of the set of visual artifacts. The first visual artifact may correspond to a first selectable function. In some embodiments, the interface component 140 detects the interaction from an input device. For example, the interface component 140 may detect a user click of a mouse, having a pointer depicted within the augmented reality user interface. The input device may also be a touch screen (e.g., receiving a user's input and replicating it within the augmented reality user interface), a motion detector (e.g., detecting movement of the user and correlating the movement into actions within the augmented reality user interface), combinations thereof, or any suitable and relevant input device. In some embodiments, the interface component 140 cooperates with the detection component 110 to detect utterances or vocalizations of the user, identify a movement or interaction associated with the utterance or vocalization, and implement the interaction. For example, the detection component 110 may detect an utterance and determine the utterance refers to the first visual artifact. The interface component 140, in cooperation with the detection component 110, may detect the interaction with the first visual artifact. Although described with reference to a first visual artifact, it should be understood that the interface component 140 may detect interaction with any one or more visual artifact of the set of visual artifacts.

In some embodiments, once the interface component 140 detects the interaction, the interface component 140 may store an indicator for the interaction. The indicator may represent the first visual artifact, the first selectable function, the utterance, and the ambiguity level of the utterance. The interface component 140 may store the indicator as within a user log, incorporate the interaction within the user profile, or otherwise store the indicator for use by the augmented reality interface system 102.

In some embodiments, the profile component 150 modifies a vocalization profile of the user of the augmented reality device based on the indicator for the interaction. The profile component 150 may modify the vocalization profile of the user (e.g., the user profile) to increment or otherwise increase a frequency of use of one or more of an utterance, a keyword, an operation, a device, or an application associated with the indicator. In some embodiments, the profile component 150 modifies the vocalization profile after a threshold event occurs. The threshold event may include a time or interval, a number of interactions, a percentage of interactions, or any suitable and relevant threshold for modifying or updating the vocalization profile.

In some embodiments, the profile component 150 uses the indicator for the interaction as a form of feedback for the augmented reality user interface and the augmented reality interface system 102. The profile component 150 may use the indicator as implicit feedback or explicit feedback. Implicit feedback may evaluate learning operations or models of the augmented reality interface system 102 through observation or use. The profile component 150 may use implicit feedback as reinforcement learning, taking into account actions that are being performed by the user when interacting with the augmented reality interface system 102, IoT devices, or any other system or device. The profile component 150 may use implicit feedback as reinforcement learning, incorporating a time of interaction with the systems or devices with which interactions occurred. In some instances, the profile component 150 uses the implicit feedback to develop a pattern history or update a usage pattern for the user within the user profile.

In some embodiments, the profile component 150 uses the indicator as explicit feedback, taking into account a user's explicit actions or creation of augmented reality user interfaces in different devices (e.g., phone widgets, computer screens, augmented reality display modulation, etc.). The profile component 150 may use the explicit feedback to assist in building more intuitive designs in the augmented reality or virtual reality environment to keep track of the user's preferences. For example, the profile component 150 may monitor preferences of switching between different modes of user interface screens, a frequency of switching, a duration of switching, and an event precipitating the switch. The profile component 150 may also monitor preferences with respect to presentation styles for visual artifacts (e.g., presenting text boxes vs. application icons). In this way, the profile component 150 may enhance the accuracy in training a feedback module or the user profile to predict a user interface for a given context and a particular time.

At operation 250, the artifact component 130 modifies the augmented reality user interface in response to the interaction with the first visual artifact. The artifact component 130 may modify the augmented reality user interface by removing the set of visual artifacts, presenting one or more subsequent visual artifacts, terminating the augmented reality user interface, combinations thereof, or any other suitable and relevant modification. In some embodiments, the artifact component 130 initiates another application, program, operation, function, or device associated with the first visual artifact. For example, in response to selecting the first visual artifact, associated with a music application, the artifact component 130 may access an API or other documentation for the music application. Based on the API or hook of the music application, or other available service, the artifact component 130 may initiate playback of music within the music application, open the music application within a mobile computing device and the augmented reality user interface, or open or initiate the music application in a smart speaker or other IoT device. In some instances, where the artifact component 130 opens or initiates an application associated with the first visual artifact, the artifact component 130 may generate additional visual artifacts or user interface elements. For example, where the first visual artifact is associated with the music application, upon selection of the first visual artifact, the artifact component 130 may remove the first visual artifact and display user interface elements for the music application, such as a playlist, a play/pause button, a fast forward button, a back button, and other suitable visual artifacts.

In some instances, the user interface elements may be contextually displayed. In the example of the music application, the user interface elements may be displayed where a smart speaker, playing music, is in a field of view of the augmented reality user interface. Where the field of view excludes the smart speaker or the smart speaker exits the field of view, the artifact component 130 may modify the user interface elements to minimize or remove the music application. The music application may be resized or reappear where the smart speaker comes back into the field of view or where the user selects the user interface element or otherwise demonstrates a desire to access the music application.

In some embodiments, the artifact component 130 cooperates with one or more component of the augmented reality interface system 102 to modify an interaction with a virtual assistant in response to the interaction. The augmented reality interface system 102 may cause the virtual assistant, running on a device connected to or accessible by the augmented reality interface system 102, to perform one or more operations. For example, where the interaction is selection of a visual artifact associated with playback of music by a music application, the augmented reality interface system 102 may interact with a smart speak, on which the virtual assistant is operating. The augmented reality interface system 102 may pass the function associated with the selected visual artifact to the smart speaker. The function may initiate one or more operations by the smart speaker or the virtual assistant to execute the function, such as initiating playback of selected music through the smart speaker using the music application.

Figure 3:
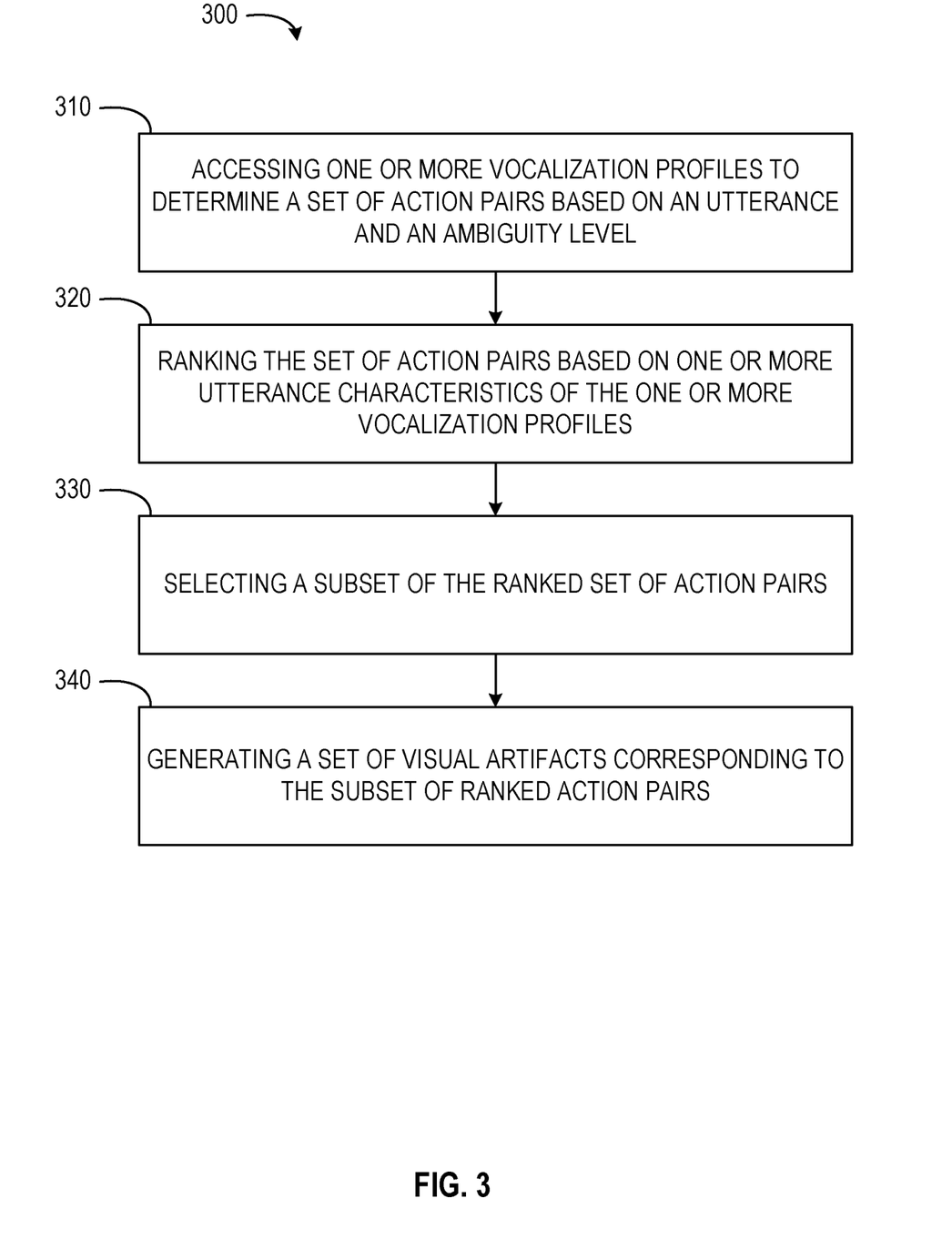
FIG. 3 depicts a flow diagram of a computer-implemented method for dynamic augmented reality interface creation, according to at least one embodiment.

FIG. 3 shows a flow diagram of an embodiment of a computer-implemented method 300 for dynamic augmented reality interface creation. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the artifact component 130 accesses one or more vocalization profiles to determine a set of action pairs based on an utterance and an ambiguity level. Each action pair is defined by an utterance and a corresponding function. In some embodiments, a single utterance is associated with more than one function, such that an utterance may be part of more than one action pair. For example, an utterance of "music" may be associated with functions for launching three different music applications, functions for initiating playback of music using each of the three different music applications, functions for terminating playback or closing each of the three different music applications, and other suitable functions.

In operation 320, the artifact component 130 ranks the set of action pairs based on one or more utterance characteristics of the one or more vocalization profiles. In some embodiments, the vocalization profiles include profile characteristics. Profile characteristics may include utterance characteristics, function characteristics, usage characteristics, history characteristics, and preference characteristics. Utterance characteristics may represent preferred vocabulary or commands indicating common commands uttered by a user and usage of the common commands. Usage of the common commands may represent a frequency of command usage, a time of command usage, a context of command usage (e.g., device context, event context, location context), and other suitable and relevant usage statistics. Function characteristics may represent preferred or commonly used functions accessed, launched, or executed by the user. Function characteristics may include information defining frequency of function usage, time of function usage, context of function usage, and other suitable and relevant usage statistics for functions or applications stored on one or more device. Usage characteristics may include the usage statistics described above. In some embodiments, usage characteristics correlate or otherwise associate utterances with functions, such that usage characteristics may indicate most commonly used utterances to perform the most commonly used functions. History characteristics may define a history of commands by the user, a frequency of commands over time, characteristics of command introduction (e.g., first use of a command, first function activated with a new command), characteristics of function introduction (e.g., time, location, and context of newly installed applications), commands rarely or no longer used, and other suitable characteristics indicating changes in usage of the augmented reality interface system 102 over time.

The artifact component 130 may rank the set of action pairs based on the profile characteristics defined for the global profile (e.g., a first vocalization profile) or the user profile (e.g., a second vocalization profile). In some embodiments, the artifact component 130 ranks the set of action pairs based on the global profile where profile characteristics for the user profile indicate the utterance is new or infrequently used by the user. The artifact component 130 may rank the set of action pairs based on the user profile as a default or where profile characteristics of the user profile represent a more accurate ranking.

In some embodiments, the artifact component 130 ranks the set of action pairs based on a context in which the utterance was issued (e.g., a location context, an event context, a time context, etc.), such that action pairs most related to a current context are ranked higher. The artifact component 130 may rank the set of action pairs based on a frequency of usage of the utterance (e.g., a frequency of usage globally or a frequency of usage by the user), such that action pairs for more commonly used keywords are ranked higher. The artifact component 130 may rank the set of action pairs based on a frequency of function usage, such that most commonly used functions (e.g., most common global functions or most common user functions) are ranked higher. In some embodiments, the artifact component 130 ranks the set of action pairs based on a plurality of profile characteristics, such that action pairs are ranked higher where the action pair is contextually appropriate, a keyword of the action pair is frequently used, and a function of the action pair is frequently used. Although described with respect to specified characteristics, it should be understood that the artifact component 130 may use any combination of profile characteristics to rank the action pairs.

In operation 330, the artifact component 130 selects a subset of the ranked set of action pairs. In some embodiments, the artifact component 130 selects the subset of ranked action pairs based on a relevancy threshold. The relevancy threshold may be a value associated with the ambiguity level or a probability of selection, such that action pairs having a low ambiguity level or a high probability of selection may be included in the subset of ranked action pairs. In some instances, the artifact component 130 selects the subset of ranked action pairs as a function of field of view within the augmented reality user interface. In such embodiments, the artifact component 130 may determine a total amount or percentage of the field of view, a size of the visual artifacts, and a font size of the visual artifacts, and dynamically select a number of action pairs for the subset of ranked action pairs which may be displayed within the percentage of field of view, with a suitable visual artifact size and font size. In some instances, the artifact component 130 selects the subset of ranked action pairs based on a specified threshold value. For example, the threshold value may be five visual artifacts. The artifact component 130 may select the top five ranked action pairs of the ranked set of action pairs for inclusion as five separate visual artifacts to be presented within the augmented reality user interface. In some embodiments, the artifact component 130 selects ranked action pairs based on a frequency of use of one or more of the utterance or the function. In such embodiments, the artifact component 130 may determine a number of ranked action pairs which are most frequently used for inclusion in the subset of ranked action pairs. The number of such subsets may be dynamically determined, determined based on user profile settings, or determined through any other suitable manner. Although described with respect to specified embodiments, it should be understood that the artifact component 130 may select any suitable number of ranked action pairs for inclusion in the subset of ranked action pairs.

In operation 340, the artifact component 130 generates a set of visual artifacts corresponding to the subset of ranked action pairs. The artifact component 130 may generate the set of visual artifacts in a manner similar to or the same as described above with respect to operation 230. In some embodiments, the artifact component 130 generates a separate or distinct visual artifact for each ranked action pair within the subset of ranked action pairs. In some instances, each visual artifact may comprise a logo or icon associated with the function of an action pair. For example, where an action pair includes a function of opening a music application, the visual artifact for the action pair may be an icon for the music application. In some embodiments, the visual artifacts may include text indicating the function to be performed. For example, where a first function of a first action pair opens a music application and a second function of a second action pair initiates playback of a recent playlist, the artifact component 130 may generate a first visual artifact with the icon of the music application and text reading "Open the App." The artifact component 130 may generate a second visual artifact with an icon, logo, or representation of the recent playlist (e.g., an album cover) and text reading "Continue Favorites Playlist." Each visual artifact may be linked to functionality within an application, user interface, or API, such that selection of the visual artifact connects to or triggers logic operations within a virtual assistant or mobile computing device to initiate the desired functionality.

Figure 4:
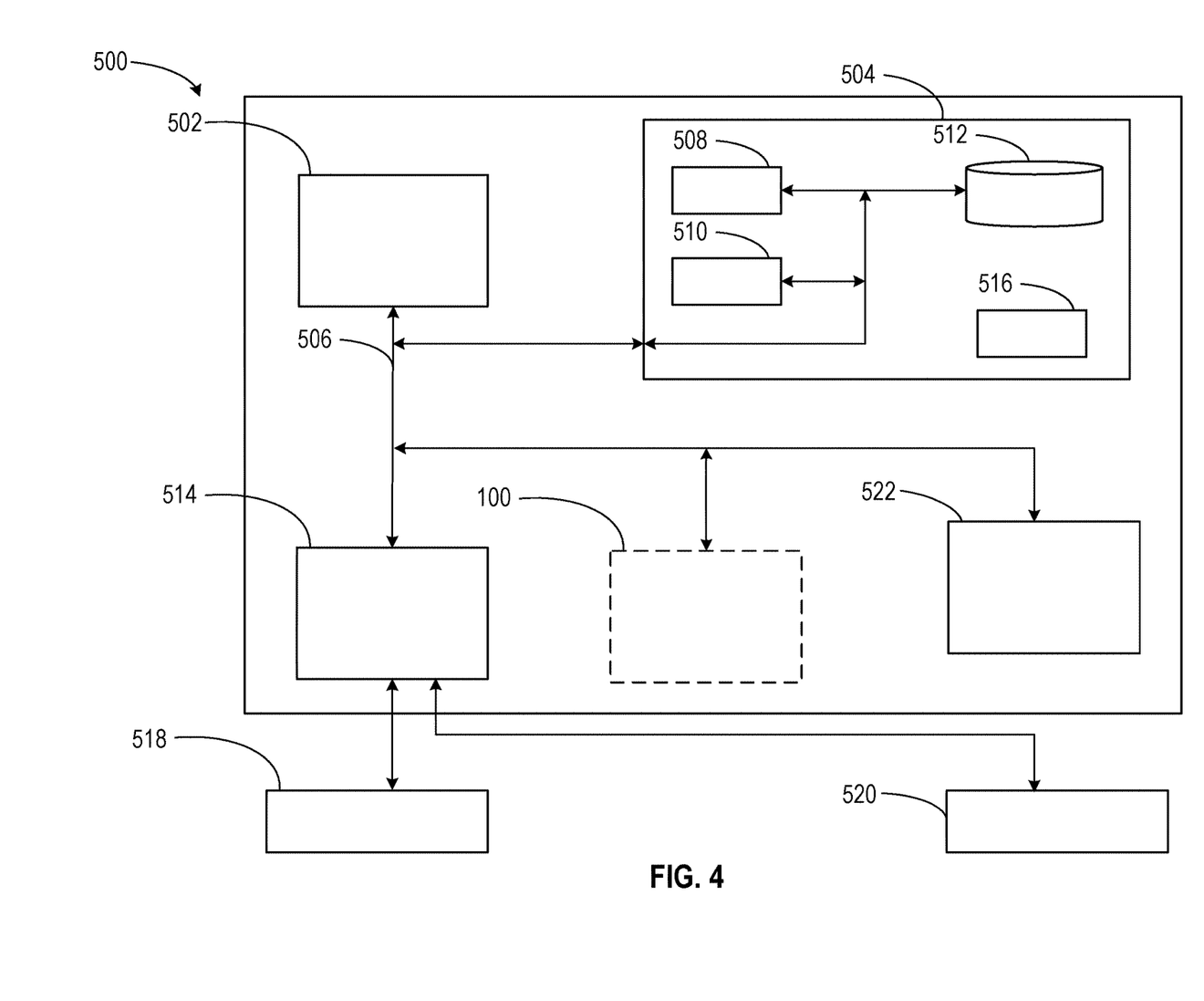
FIG. 4 depicts a block diagram of a computing system for dynamic augmented reality interface creation, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for dynamic augmented reality interface creation.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the detection component 110, the ambiguity component 120, the artifact component 130, the interface component 140, and the profile component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Figure 5:
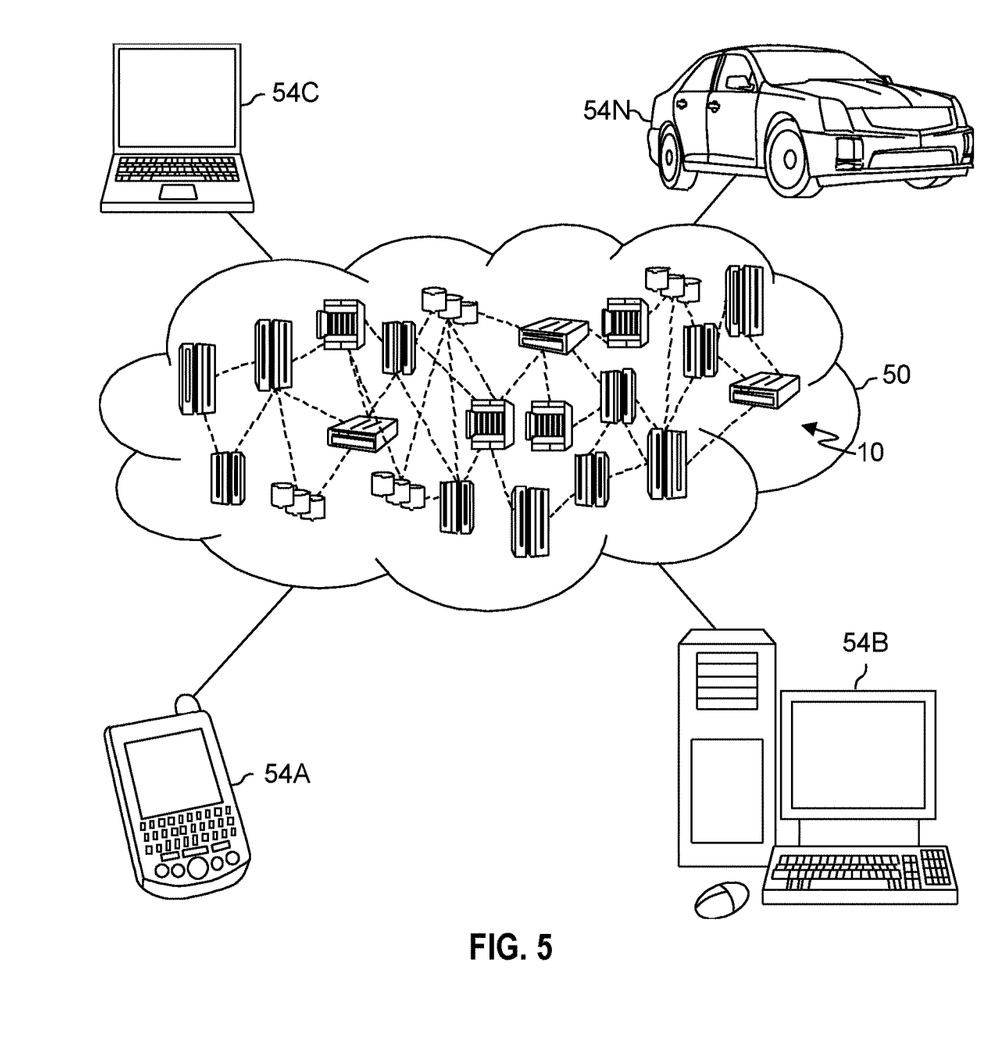
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
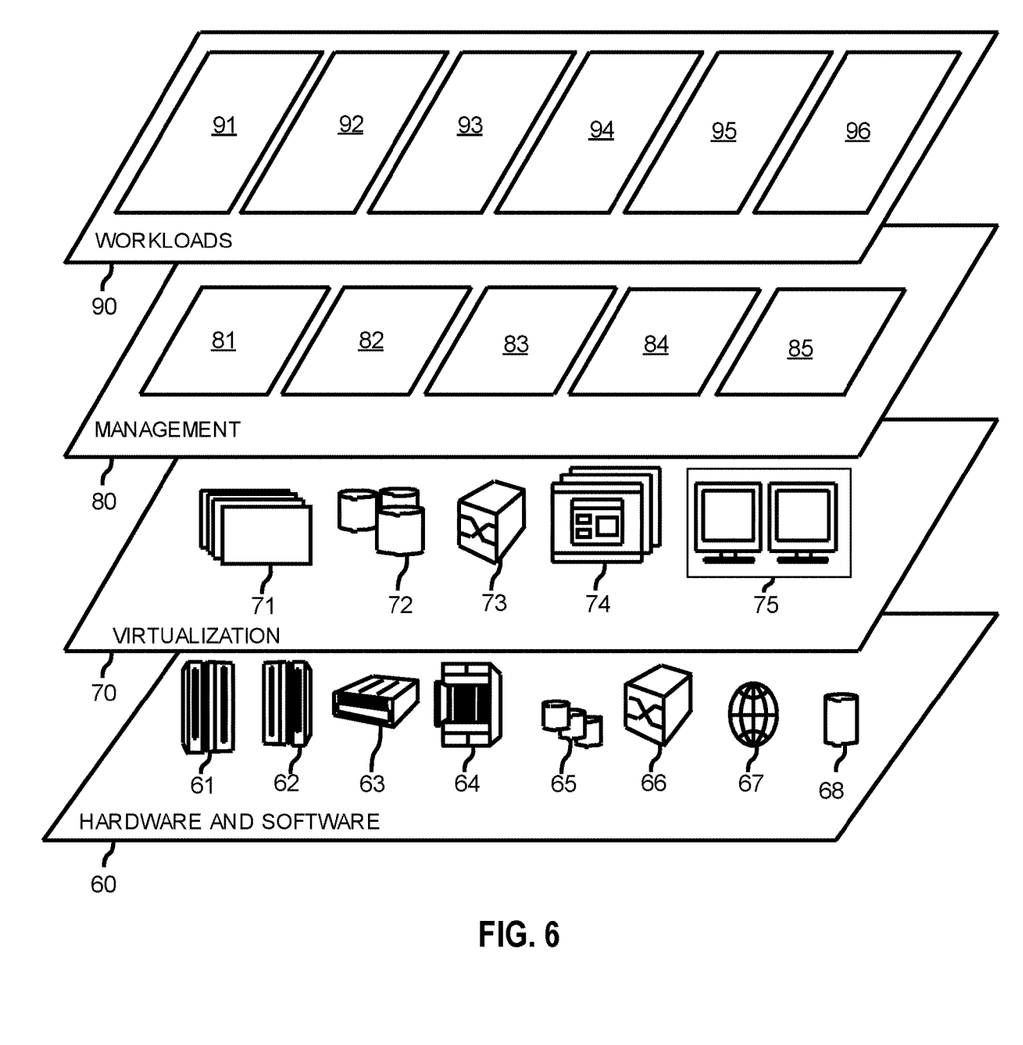
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIGS. 5 and 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer-readable storage medium (or media) having computer readable program instructions thereon for causing a processor to carry out aspects of the present disclosure.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting an utterance from a user of an augmented reality device;
   determining a context of the utterance based on audio and visual input to the augmented reality device;
   based on the context of the utterance, determining an ambiguity level of the utterance;
   based on the utterance, the context, and the ambiguity level, generating a set of visual artifacts within an augmented reality user interface, each visual artifact of the set of visual artifacts corresponding to a selectable function;
   detecting interaction with a first visual artifact of the set of visual artifacts, the first visual artifact corresponding to a first selectable function; and
   modifying the augmented reality user interface in response to the interaction with the first visual artifact.

2. The computer-implemented method of claim 1, wherein detecting the utterance from the user further comprises:
   detecting a vocalization at the augmented reality device; and
   comparing the vocalization to one or more vocalization profiles to determine the vocalization is the utterance corresponding to one or more functions.

3. The computer-implemented method of claim 2, wherein the one or more vocalization profiles comprises a global profile representing utterances of a plurality of users, the global profile defining utterance characteristics of the plurality of users.

4. The computer-implemented method of claim 2, wherein the one or more vocalization profiles comprises a user profile representing historical utterances of the user of the augmented reality device, the user profile defining utterance characteristics of the user of the augmented reality device.

5. The computer-implemented method of claim 1, wherein generating the set of visual artifacts further comprises:
   accessing one or more vocalization profiles to determine a set of action pairs based on the utterance and the ambiguity level, each action pair defined by an utterance and a corresponding function;
   ranking the set of action pairs based on one or more utterance characteristics of the one or more vocalization profiles; and
   selecting a subset of the ranked set of action pairs.

6. The computer-implemented method of claim 1, further comprising:
   storing an indicator for the interaction, the indicator representing the first visual artifact, the first selectable function, the utterance, and the ambiguity level of the utterance.

7. The computer-implemented method of claim 6, further comprising:
   modifying a vocalization profile of the user of the augmented reality device based on the indicator for the interaction.

8. A system, comprising:
   one or more processors; and
   a computer-readable storage medium, coupled to the one or more processors, storing program instructions that, when executed by the one or more processors, cause the one or more processors to perform operations comprising:
   detecting an utterance from a user of an augmented reality device;
   determining a context of the utterance based on audio and visual input to the augmented reality device;
   based on the context of the utterance, determining an ambiguity level of the utterance;
   based on the utterance, the context, and the ambiguity level, generating a set of visual artifacts within an augmented reality user interface, each visual artifact of the set of visual artifacts corresponding to a selectable function;
   detecting interaction with a first visual artifact of the set of visual artifacts, the first visual artifact corresponding to a first selectable function; and
   modifying the augmented reality user interface in response to the interaction with the first visual artifact.

9. The system of claim 8, wherein detecting the utterance from the user further comprises:
   detecting a vocalization at the augmented reality device; and
   comparing the vocalization to one or more vocalization profiles to determine the vocalization is the utterance corresponding to one or more functions.

10. The system of claim 9, wherein the one or more vocalization profiles comprises a global profile representing utterances of a plurality of users, the global profile defining utterance characteristics of the plurality of users.

11. The system of claim 9, wherein the one or more vocalization profiles comprises a user profile representing historical utterances of the user of the augmented reality device, the user profile defining utterance characteristics of the user of the augmented reality device.

12. The system of claim 8, wherein generating the set of visual artifacts further comprises:
   accessing one or more vocalization profiles to determine a set of action pairs based on the utterance and the ambiguity level, each action pair defined by an utterance and a corresponding function;
   ranking the set of action pairs based on one or more utterance characteristics of the one or more vocalization profiles; and
   selecting a subset of the ranked set of action pairs.

13. The system of claim 8, wherein the operations further comprise:
   storing an indicator for the interaction, the indicator representing the first visual artifact, the first selectable function, the utterance, and the ambiguity level of the utterance.

14. The system of claim 13, wherein the operations further comprise:
   modifying a vocalization profile of the user of the augmented reality device based on the indicator for the interaction.

15. A computer program product comprising a computer readable storage medium having program instructions embodied therewith, the program instructions being executable by one or more processors to cause the one or more processors to perform operations comprising:
   detecting an utterance from a user of an augmented reality device;
   determining a context of the utterance based on audio and visual input to the augmented reality device;
   based on the context of the utterance, determining an ambiguity level of the utterance;
   based on the utterance, the context, and the ambiguity level, generating a set of visual artifacts within an augmented reality user interface, each visual artifact of the set of visual artifacts corresponding to a selectable function;
   detecting interaction with a first visual artifact of the set of visual artifacts, the first visual artifact corresponding to a first selectable function; and
   modifying the augmented reality user interface in response to the interaction with the first visual artifact.

16. The computer program product of claim 15, wherein detecting the utterance from the user further comprises:
   detecting a vocalization at the augmented reality device; and
   comparing the vocalization to one or more vocalization profiles to determine the vocalization is the utterance corresponding to one or more functions.

17. The computer program product of claim 16, wherein the one or more vocalization profiles comprises a global profile representing utterances of a plurality of users, the global profile defining utterance characteristics of the plurality of users.

18. The computer program product of claim 16, wherein the one or more vocalization profiles comprises a user profile representing historical utterances of the user of the augmented reality device, the user profile defining utterance characteristics of the user of the augmented reality device.

19. The computer program product of claim 15, wherein generating the set of visual artifacts further comprises:
   accessing one or more vocalization profiles to determine a set of action pairs based on the utterance and the ambiguity level, each action pair defined by an utterance and a corresponding function;
   ranking the set of action pairs based on one or more utterance characteristics of the one or more vocalization profiles; and
   selecting a subset of the ranked set of action pairs.

20. The computer program product of claim 15, wherein the operations further comprise:
   storing an indicator for the interaction, the indicator representing the first visual artifact, the first selectable function, the utterance, and the ambiguity level of the utterance; and
   modifying a vocalization profile of the user of the augmented reality device based on the indicator for the interaction.

* * * * *